(12) United States Patent
Quevedo-Fernandez et al.

(10) Patent No.: US 11,630,925 B2
(45) Date of Patent: Apr. 18, 2023

(54) DISPLAY OF ENCRYPTED CONTENT ITEMS

(71) Applicant: NAGRAVISION S.A., Cheseaux-sur-Lausanne (CH)

(72) Inventors: Javier Quevedo-Fernandez, Cheseaux-sur-Lausanne (CH); Michael Guesdon, Cheseaux-sur-Lausanne (CH); Alain Henriette, Cheseaux-sur-Lausanne (CH); Bernard Benoit, Cheseaux-sur-Lausanne (CH)

(73) Assignee: Nagravision Sàrl, Cheseaux-sur-Lausanne (CH)

( * ) Notice: Subject to any disclaimer, the term of this patent is extended or adjusted under 35 U.S.C. 154(b) by 0 days.

(21) Appl. No.: 16/765,511

(22) PCT Filed: Nov. 12, 2018

(86) PCT No.: PCT/EP2018/080951
§ 371 (c)(1),
(2) Date: May 20, 2020

(87) PCT Pub. No.: WO2019/096742
PCT Pub. Date: May 23, 2019

(65) Prior Publication Data
US 2020/0311316 A1    Oct. 1, 2020

(30) Foreign Application Priority Data

Nov. 20, 2017   (EP) .................... 17202645

(51) Int. Cl.
*G06F 3/048*    (2013.01)
*G06F 21/84*    (2013.01)
(Continued)

(52) U.S. Cl.
CPC ............ *G06F 21/84* (2013.01); *G06F 3/0485* (2013.01); *H04L 51/046* (2013.01)

(58) Field of Classification Search
CPC ...... G06F 21/84; G06F 3/0485; G06F 40/103; G06F 40/166; G06F 3/04886;
(Continued)

(56) References Cited

U.S. PATENT DOCUMENTS 7,316,032 B2 * 1/2008 Tayebi .................. G06Q 30/06
                                                                  705/51
8,776,249 B1 * 7/2014 Margolin ............ G06F 21/6209
                                                                  726/26

(Continued)

FOREIGN PATENT DOCUMENTS

FR        2917931 A1    12/2008
WO    2007/075573 A2     7/2007

*Primary Examiner* — Mahelet Shiberou
(74) *Attorney, Agent, or Firm* — Hoyng Rokh Monegier B.V.; David P. Owen

(57) ABSTRACT

A method of displaying content items, for example message items in a messaging application or service, is disclosed. The method comprises receiving encrypted content items in a chronological sequence; decrypting the content items; causing display of a display sequence, in order of the chronological sequence, of a respective place holder in place of each of the decrypted content items, and, in response to a user input, causing display of the respective content item in place of one or more of the place holders. Each place holder has an appearance of a scrambled version of the respective content item. The display sequence may be contiguous in received items or sent content items may be interleaved with received content items in the display sequence, in which case sent content items may be displayed with place holders in the same way as received items. A corresponding system and corresponding computer readable medium or media are also disclosed.

16 Claims, 7 Drawing Sheets

(51) Int. Cl.
*G06F 3/0485* (2022.01)
*H04L 51/046* (2022.01)

(58) Field of Classification Search
CPC .............. G06F 21/6245; H04L 51/046; H04M 1/72436; H04M 1/72463
See application file for complete search history.

(56) References Cited

U.S. PATENT DOCUMENTS

| | | | |
|---|---|---|---|
| 9,282,081 B2 * | 3/2016 | Collins | G06Q 10/00 |
| 2003/0165240 A1 * | 9/2003 | Bantz | H04L 9/0866 |
| | | | 380/54 |
| 2010/0064375 A1 * | 3/2010 | Gorczowski | G06F 21/84 |
| | | | 726/28 |
| 2010/0077360 A1 * | 3/2010 | Nason | G06F 21/82 |
| | | | 715/856 |
| 2010/0131868 A1 * | 5/2010 | Chawla | G06F 3/0481 |
| | | | 715/759 |
| 2010/0146052 A1 | 6/2010 | Pare et al. | |
| 2010/0223314 A1 * | 9/2010 | Gadel | H04L 51/38 |
| | | | 709/200 |
| 2012/0131471 A1 | 5/2012 | Terlouw et al. | |
| 2013/0103943 A1 | 4/2013 | Hirsch et al. | |
| 2014/0047560 A1 * | 2/2014 | Meyer | G06F 21/10 |
| | | | 726/28 |
| 2014/0201527 A1 * | 7/2014 | Krivorot | G06F 21/6209 |
| | | | 713/168 |
| 2015/0007351 A1 * | 1/2015 | Janajri | H04L 51/00 |
| | | | 726/30 |
| 2015/0128251 A1 | 5/2015 | Yoon et al. | |
| 2015/0288633 A1 * | 10/2015 | Ogundokun | H04L 51/04 |
| | | | 709/206 |
| 2016/0094495 A1 * | 3/2016 | Ahuja | G06F 40/166 |
| | | | 715/753 |
| 2016/0125181 A1 * | 5/2016 | Dai Zovi | G06F 3/0236 |
| | | | 726/19 |
| 2016/0314720 A1 | 10/2016 | Kim et al. | |
| 2017/0061164 A1 * | 3/2017 | Schmugar | H04L 9/083 |
| 2017/0255786 A1 | 9/2017 | Krishnamurthi | |
| 2019/0132438 A1 * | 5/2019 | Loughran | G06F 40/166 |

* cited by examiner

DISPLAY OF ENCRYPTED CONTENT ITEMS

FIELD

The present disclosure relates to the display of content items received in encrypted form.

BACKGROUND

Many applications and services in use today are protected by cryptography and manage encrypted content. Most users are not specialists, and hence do not have awareness about the fact that they are using an application or service that offers a secure encrypted environment. As a result, users can be confused about which applications are securely processing and storing the information, and which are not. This can lead to users making mistakes and to use unsecured applications even when there is a need to protect the content. There is thus a need to inform users that they are using a secure application or service. Some applications or services address this need by showing a security indicator, or by displaying a small lock or similar icon somewhere within the user interface. However, users normally do not pay attention to these indicators or simply forget that they even existed in the first place as time goes by.

BRIEF DESCRIPTION OF THE DRAWINGS

Embodiments of a method and system for displaying content received (and, in some embodiments, stored) in encrypted form are disclosed by way of example with reference to the accompanying drawings, in which.

DETAILED DESCRIPTION

Figure 1:
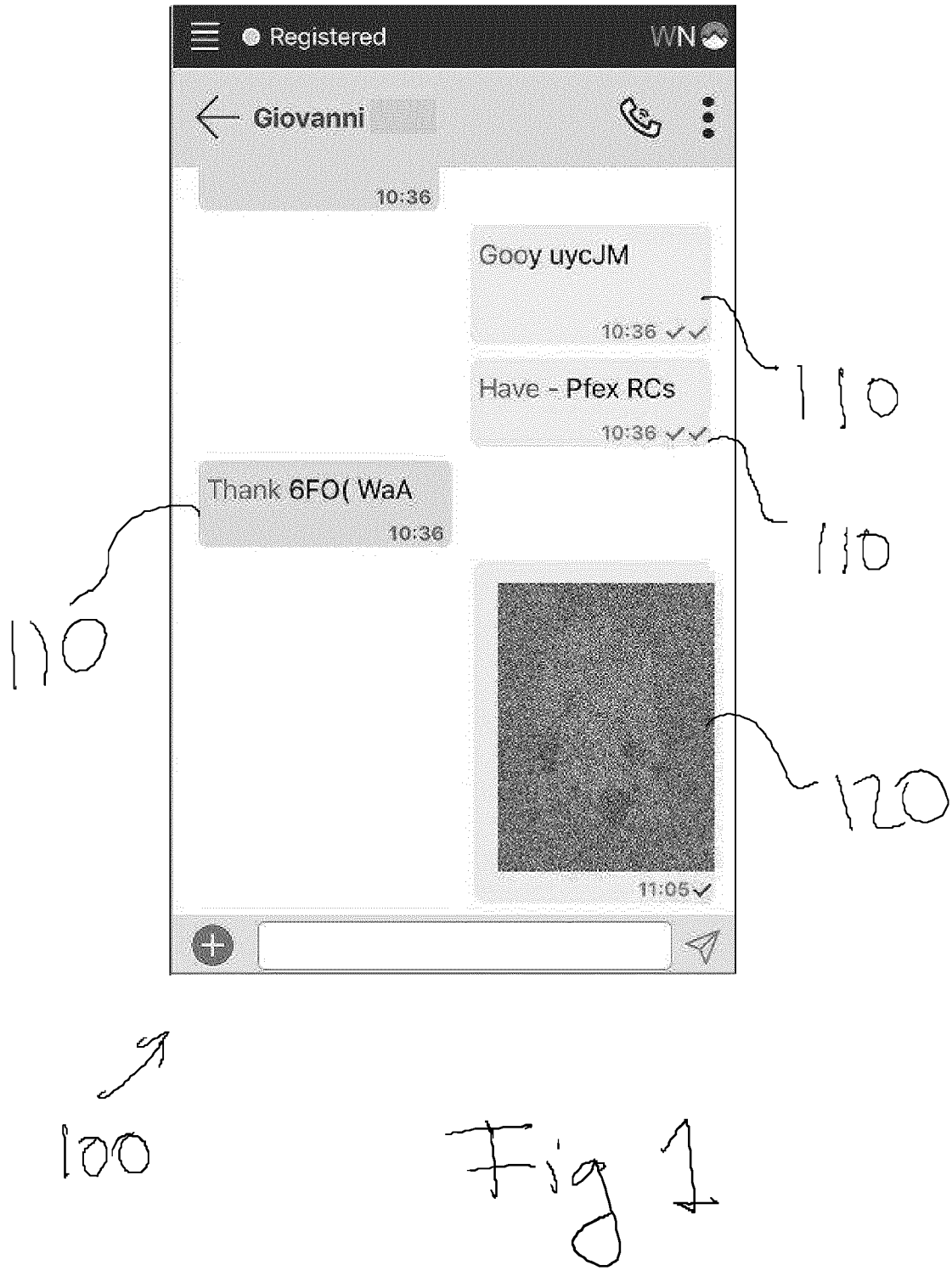
FIG. 1 illustrates a messaging application with a display indicating a secure environment.

In overview, a novel presentation paradigm for different media types, such as text, images, videos and/or streamed media and the like, is disclosed that represents to a user that data is securely received and/or stored, for example in the context of a messaging application. The mechanism shows an allegory (for security purposes) of deciphering the content as the user is accessing or operating the application or service. Specifically, a place holder representative of a scrambled version of a content item that has been received and/or stored is displayed instead of the content item and the content item is revealed to the user in response to a user input, for example the scrolling of the display or the accessing or starting of the application or service used to access the content. In this way, the secure nature of the displayed content is brought to the user's attention in a way that is harder to ignore but at the same time appears natural and not intrusive. Additionally, security is enhanced by displaying a scrambled place holder until a user input is received.

In an aspect, a method of displaying content items, for example message items in a messaging application or service, comprises receiving encrypted content items in a chronological sequence; decrypting the content items; causing display of a display sequence, in order of the chronological sequence, of a respective place holder in place of each of the decrypted content items and, in response to a user input, causing display of the respective content item in place of one or more of the place holders. Each place holder has an appearance of a scrambled version of the respective content item. The display sequence may be contiguous in received items or sent content items may be interleaved with received content items in the display sequence, in which case sent content items may be displayed with place holders in the same way as received items.

In some embodiments, displaying the respective content item in place of one or more of the place holders comprises displaying an animation of each place holder turning into the respective content item. For example, in case of textual content items, displaying an animation may comprise progressively changing symbols of the respective place holder text into symbols of the content item text over a period of time. For example, the respective place holder may comprise a random sequence of symbols replacing at least a portion of the content item, and the animation may comprise replacing content item symbols with place holder symbols, for example progressively from left to right. In the case of image content items, for example a preview image of a large image or a video frame, displaying an animation may comprise displaying a sequence of images combining the place holder image and content item image and fading from the place holder image to the content item image. For example, the respective place holder may comprise a noise pattern replacing the image of the content item.

In some embodiments, the user input comprises a scroll command to scroll the display sequence. In these embodiments, causing display of a respective content item in place of one or more place holder may comprise causing display of the respective content item in place of the one or more place holders for one or more most recent content items in the display sequence.

In some embodiments, the method comprises receiving a new content item, decrypting the new content item and causing display of the new content item as a new item in the display sequence. The method may comprise, in response to receiving, the new content item, displaying a place holder in place of the previously most recent content item, wherein the place holder has an appearance of a scrambled version of the previously most recent content item.

In some embodiments, content items, once received, decrypted and displayed, remain displayed in clear. In some embodiments, place holders are displayed in place of previously displayed content items when one or more of the following events has occurred: the application or service has been placed in the background of the device or the user has navigated away from a relevant application or service window and the application or service is brought to the foreground or focus again; the application or service has been exited and is launched again; and a predetermined period of time without user input or other user activity in relation to the application or service has passed.

Aspects of the disclosure relate to a system for displaying content items received in encrypted form, the system comprising a receiver configured to receive encrypted content items in a chronological sequence; a memory configured to store received content items;

a display configured to display content items; and a processor configured implement methods as described above. Aspects further relate to tangible computer readable medium or media, for example portable media or installed in a computing device, encoding computer code instructions which, when executed on a computing device, implement methods as described above.

In yet further aspects, a method for generating an indicator that streaming content, such as a video or audio stream or a video or audio call, is secure is disclosed. The method comprises displaying a random looking content item, for example a sequence of symbols and changing the random looking content item, such as the random sequence, at predetermined intervals. The random content (e.g. sequence) may be random or pseudorandom or may be a pre-determined content (e.g. sequence) appearing to be random. The content (e.g. sequence) is displayed in an application/display displaying or providing access to the streaming content.

Turning now to specific embodiments, described by way of example, with reference to FIG. 1, a messaging application 100 comprises a display of sent and received display items 110, 120 displayed in a chronological display sequence corresponding to the chronological sequence of sending and receiving. Items 110 are textual items and item 120 is an image item. The display items are shown partially transitioned from display of place holder items, to content items. The place holder items have content that resemble a scrambled version of the content of content items replaced by the place holder items. It will be appreciated that FIG. 1 represents a snapshot of the transition from content fully resembling a scrambled version to the content item itself. In some embodiments, the content item remains displayed in clear when the application or service is continued to be used. In some embodiments, the placeholder shows content resembling a partially scrambled version as illustrated in FIG. 1 as the initial or only state of the place holder. In the example illustrated in FIG. 1, all displayed items transition together, but other arrangements are equally possible, for example as described below.

Figure 2:
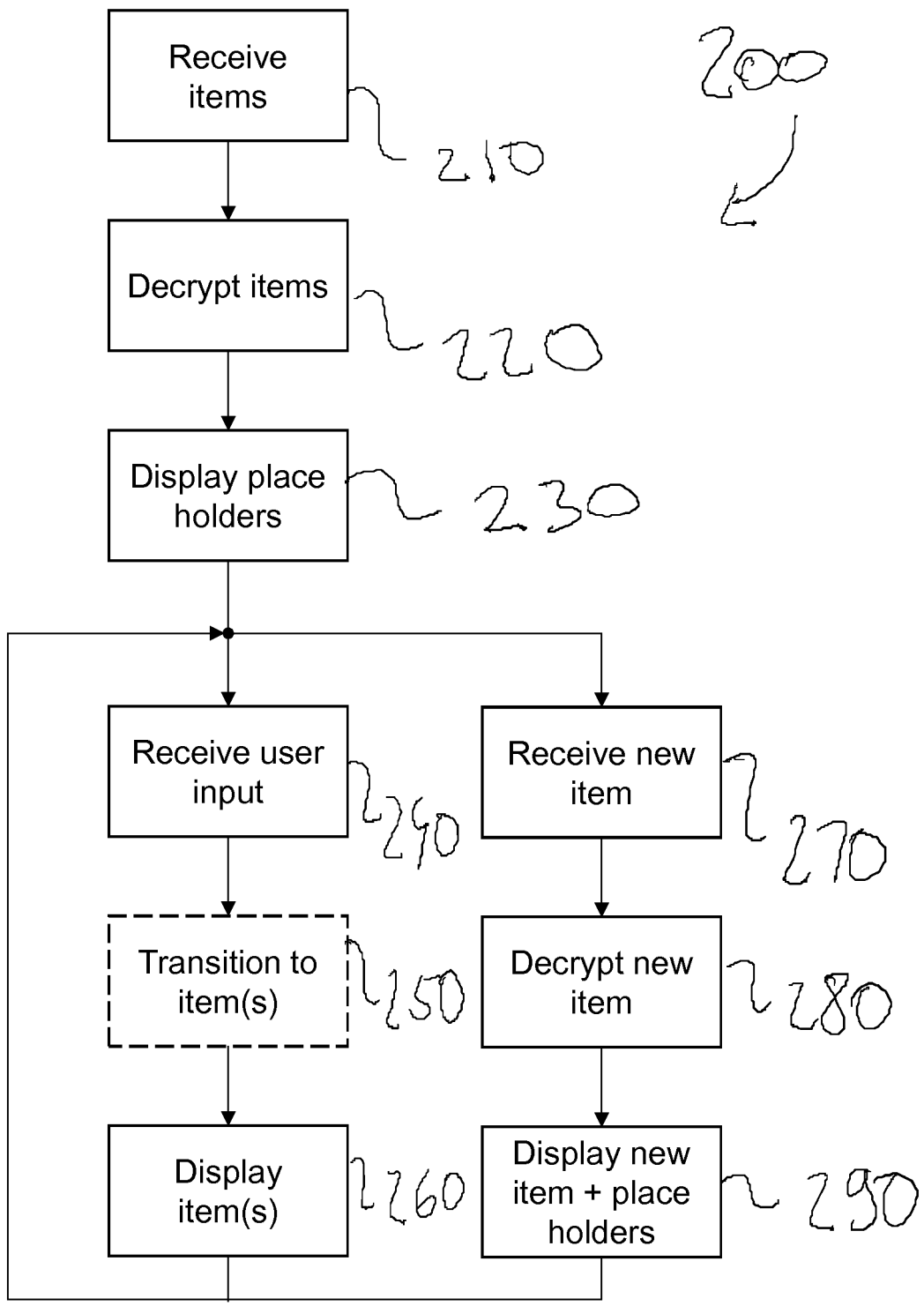
FIG. 2 illustrates a method of displaying content and place holder items to indicate a secure environment.

With reference to FIG. 2, a method 200 of displaying content items received in encrypted form is now described. Encrypted content items are received at step 210 and decrypted at step 220. Place holder items are displayed in the application in place of the decrypted content items in chronological sequence as described above. In some embodiments, equivalent steps (not shown) occur for sent items, that is sent content items are encrypted and sent and place holder items for the sent content items are displayed in chronological sequence of sending, in some embodiments interleaved with received items. In some embodiment, sent and received items are distinguished in some way, for example by colour, shape of an outline or position in the display, for example displaying sent items to one side and received items to the other, as in the example illustrated in FIG. 1.

At step 240 a user input is received. For example, the user input may be a request to scroll the display, for example a swipe gesture on a touch screen. Any other user input, for example a tap on a touch screen area taken up by the display or a specific button, or any other user input such as a key press on a key board, a mouse click, voice command and so forth may of course be substituted for the scroll request. The user input may also or instead be the user interaction starting or opening the application or service or an input switching to an application or service already running. In response to the user input, the display of one or more items transitions from display of the place holder item to display of the content item at step 250, as described below for textual and image content items. In some embodiments, the displayed items transition together, while in other embodiment the displayed items transition at different times or only one or some of the displayed items transitions. For example, in the case of a scroll command, only the most recent place holder item in the display sequence may transition to the corresponding content item. At the end of the transition step 250, the one or more transitioned items are displayed at step 260 as content items, that is in clear form that can be read or consumed. In some embodiments, step 250 is omitted and the items switch from place holder to content items. The process then loops back to before step 240/270 and awaits further user input or a new item arriving.

In the event of a new item arriving, the new item is received at step 270 and decrypted at step 280. At step 290 the new item is displayed as content item (in clear) in chronological sequence next to the displayed place holders or previously received clear content items, as applicable. In some embodiments a place holder for the new item is displayed instead. In some embodiments, the displayed content items are replaced by place holders on receipt of the new content item or the previously most recent content item is replaced by a place holder. It will be appreciated that many variations on the timing and triggering of transitions between place holders and content items are possible and consistent with the aim of providing a visual alert to a user in manner that is not overly intrusive or intuitive and is not easily ignored or forgotten.

In some embodiments, subsequent to step 260 or 290, as the case may be, or before step 240/270, content items, once received, decrypted and displayed, remain displayed in clear. In some embodiments, place holders are displayed in place of previously displayed content items when one or more of the following events has occurred: the application or service has been placed in the background of the device or the user has navigated away from a relevant application or service window and the application or service is brought to the foreground or focus again; the application or service has been exited and is launched again; and a predetermined period of time without user input or other user activity in relation to the application or service has passed.

Figure 3:
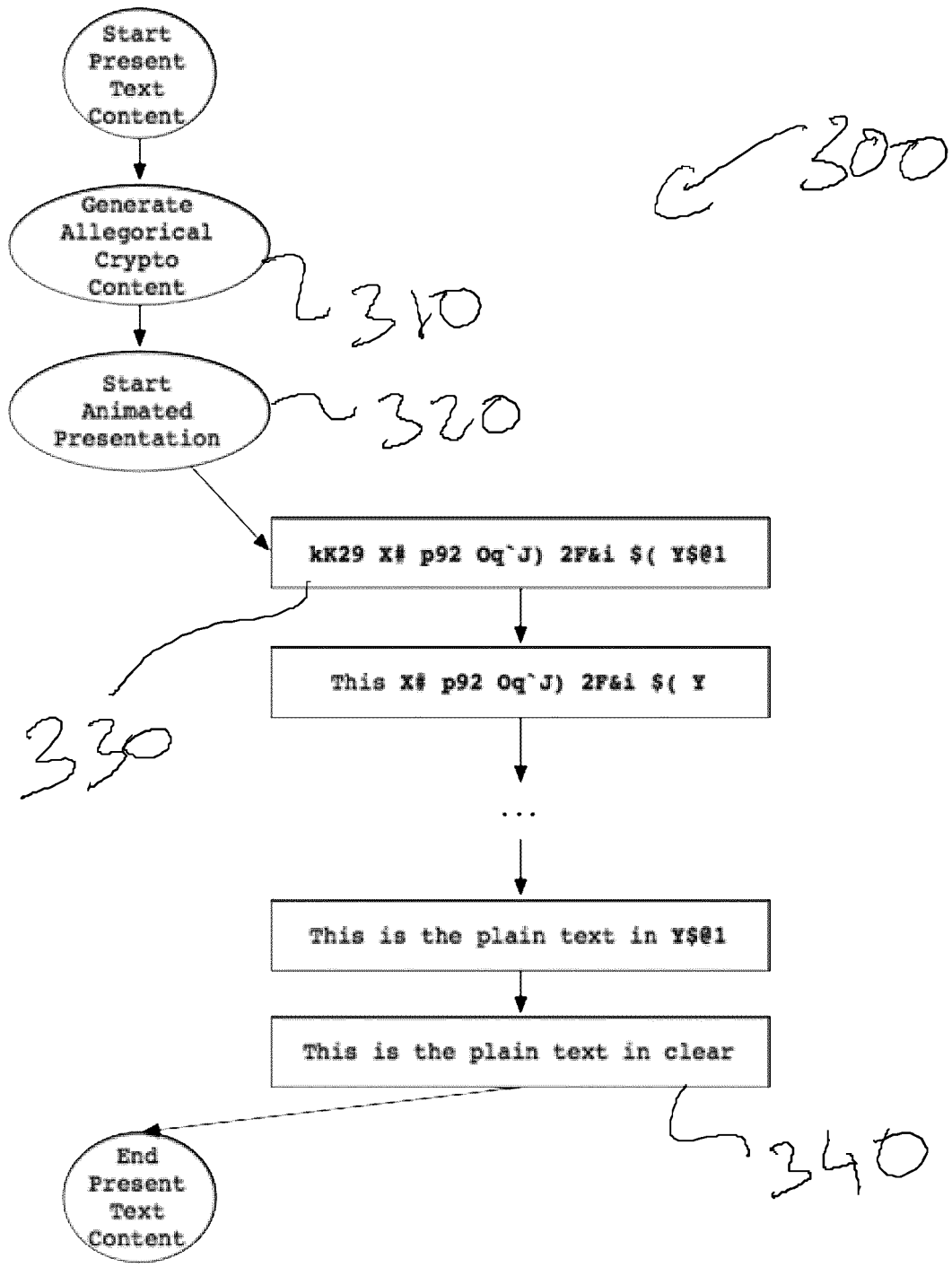
FIG. 3 illustrates a method of transitioning between textual place holder and content items.

With reference to FIG. 3, a process 300 for transitioning a place holder item for a textual content item to its respective content item is described. At step 310 the place holder is generated as a sequence of letters, or more generally symbols, of a character set in a manner so that it resembles a scrambled version of the content item. The place holder may in fact be a scrambled version of the content item or merely have the appearance, for example being generated randomly, pseudo-randomly or according to a predetermined schedule of candidate texts. In other words, the place holder is an artefact that represents what the content could look like in an encrypted state. At step 320 a transition from the place holder item 330 to the content item 340 is started. The transition proceeds by replacing the symbols of the place holder text with symbols from the content item one by one or some by some over a number of steps separated by equal or varying intervals until the transition is complete. For example the transition may proceed with symbols or groups of symbols from left to right in the text.

Figure 4:
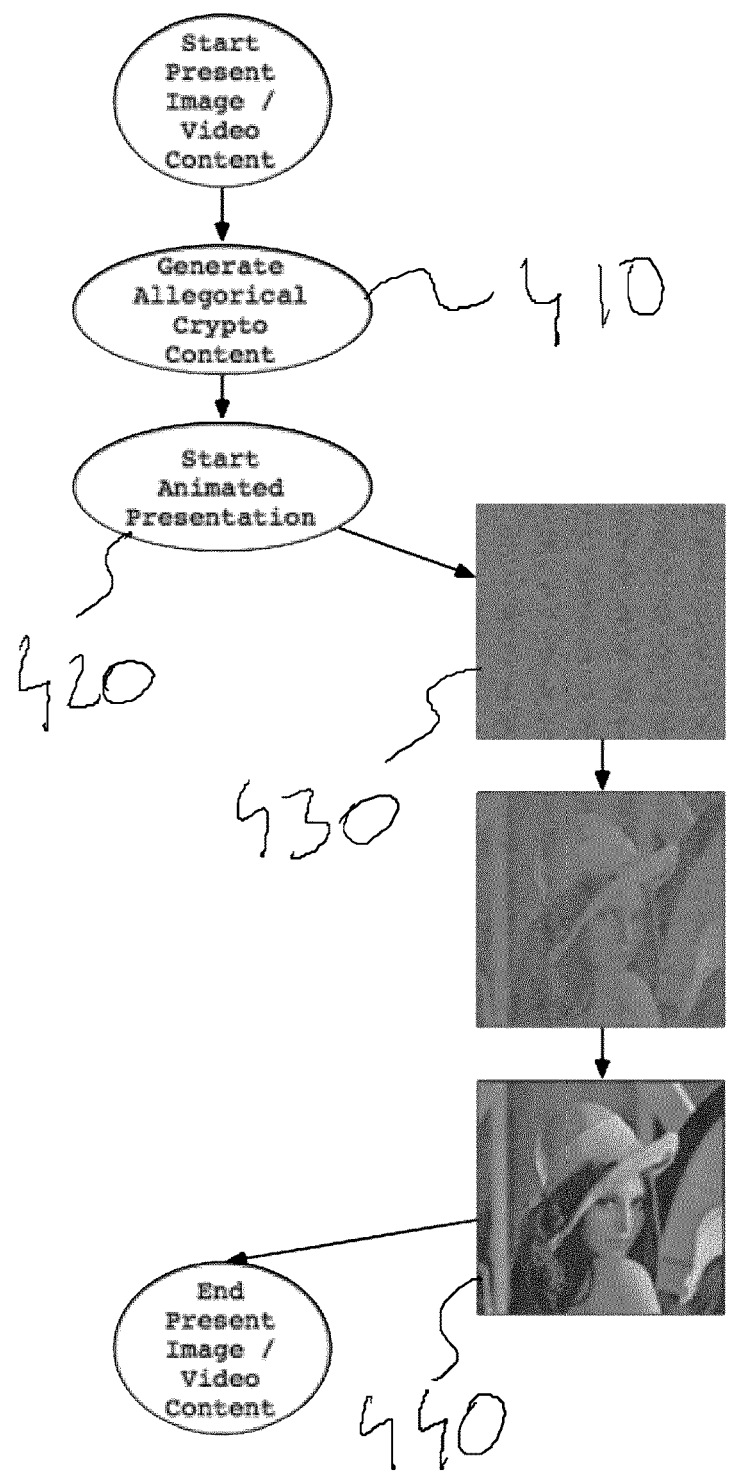
FIG. 4 illustrates a method of transitioning between image place holder and content items.

With reference to FIG. 4, a process 400 for transitioning a place holder item for an image content item to its respective content item is described. The image may be a smaller or lower resolution version of a large image or of a video frame, or may be a video frame. At step 410 the place holder is generated as a noisy looking image, for example a noise image such as white noise image, so that it resembles a scrambled version of the content item. The place holder may in fact be a scrambled version of the content item or merely have the appearance, for example being generated randomly, pseudo-randomly or according to a predetermined schedule of a number of candidate images. In other words, the place holder is an artefact that represents what the content could look like in an encrypted state. At step 420 a transition from the place holder item 430 to the content item 440 is started. The transition proceeds by blending the place holder and content item images together with time-varying respective weights to fade from the place holder image to the content item image until the transition is complete. This can be understood as placing the place holder image over the content item image and gradually increasing the transparency of the place holder image from fully opaque to fully transparent.

Figure 5:
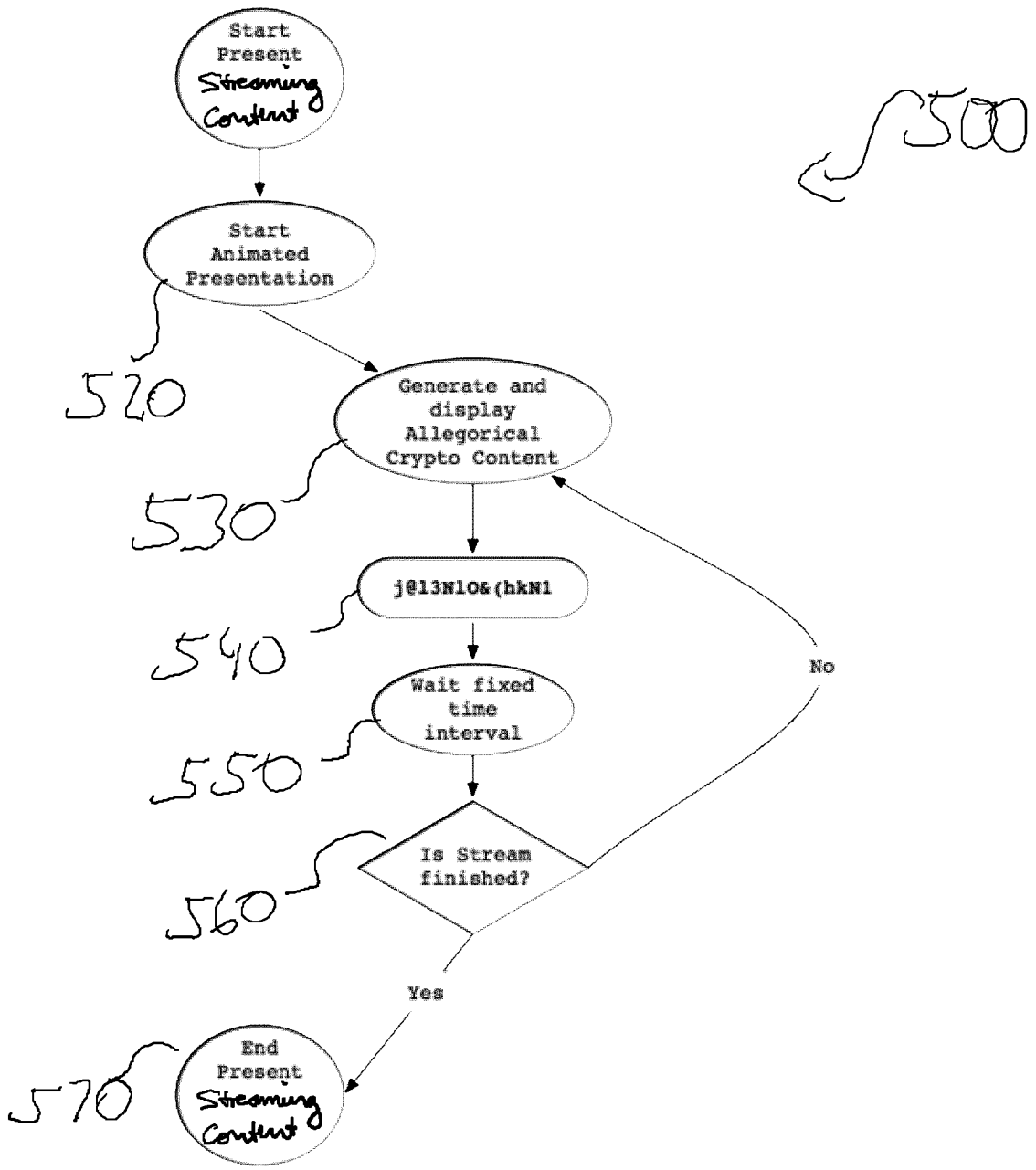
FIG. 5 illustrates a method of indicating a secure content stream.
Figure 6:
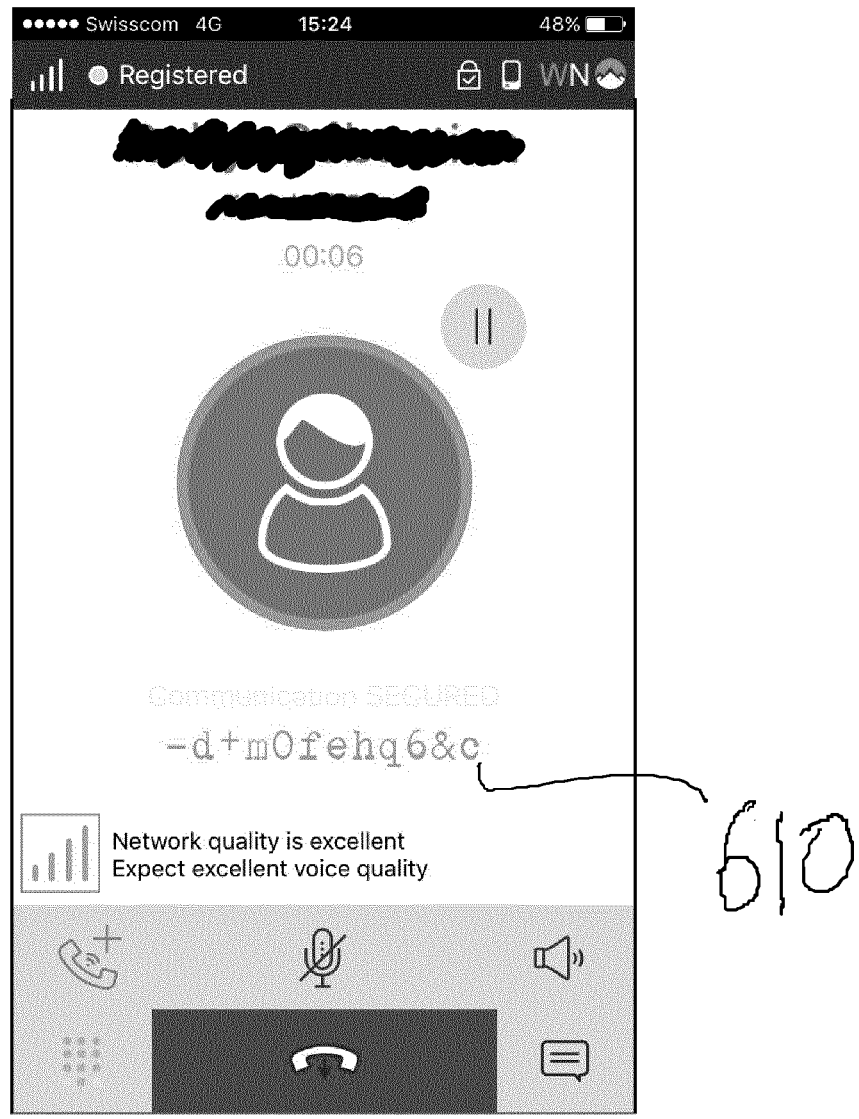
FIG. 6 illustrates a streaming content (audio call) application with an indicator according to the method of FIG. 5.

With reference to FIG. 5, a process 500 for displaying an indication of a secure communication channel in connection with streaming content, for example streaming video or audio or a video or audio call, starts by presenting the streaming content at step 510. At step 520 an animated presentation of content representative of encrypted or scrambled content is started, generating allegorical content, that is content resembling scrambled or encrypted content such as described above, at step 530, and displaying this content at step 540. For example, the content may be a random or random looking string of symbols as described above and may be generated by a random or deterministic process or by selecting from a predetermined set of such content. The content may also be a random looking image as described above. At step 550 the process waits for a time interval, which may be fixed or variable, and tests at step 560 if the content stream is finished or is still being presented. If the content stream is not finished, the process loops back to step 530 otherwise it ends at step 570. An exemplary display 600 of an application providing access to a voice call, or other streaming content, is illustrated in FIG. 6 and includes an allegorical display akin to the place holders described above and generated and managed by process 500.

In some embodiments, a mobile device, such as a smart phone, comprises a processor configured to run the secured application or service, such as a messaging or chat application or service, for exchanging content data with a server or peer to peer. The processor is configured to cause display of content items and/or place holders on a display. Previously received content is stored in the application or in the mobile device in some embodiments. The processor is configured to implement methods as described above in some embodiments. In some embodiments, the processor is configured to cause, at the launch of the application, display of place holders in the place of content items previously received, decrypted and displayed to or read by a user, and/or already stored. In some embodiments, the processor is configured to cause display of place holders in place of content items when the user is going back to the application or service, for example launching the application or service. For example, the processor is configured to then cause display of each content item in clear by switching or transitioning from the place holder to the content item, for example as described above in response to a user input such as scrolling.

In some embodiments, the processor is configured to cause display of place holders in the place of content items after a predetermined time without user activity in relation to the application. In some embodiments, the processor is configured such that content items, once received, decrypted and displayed, remain displayed in clear. In some embodiments, the processor is configured to cause display of place holders in place of previously displayed content items when one or more of the following events has occurred: the application or service has been placed in the background of the device or the user has navigated away from a relevant application or service window and the application or service is brought to the foreground or focus again; the application or service has been exited and is launched again; and a predetermined period of time without user input or other user activity in relation to the application or service has passed.

Figure 7:
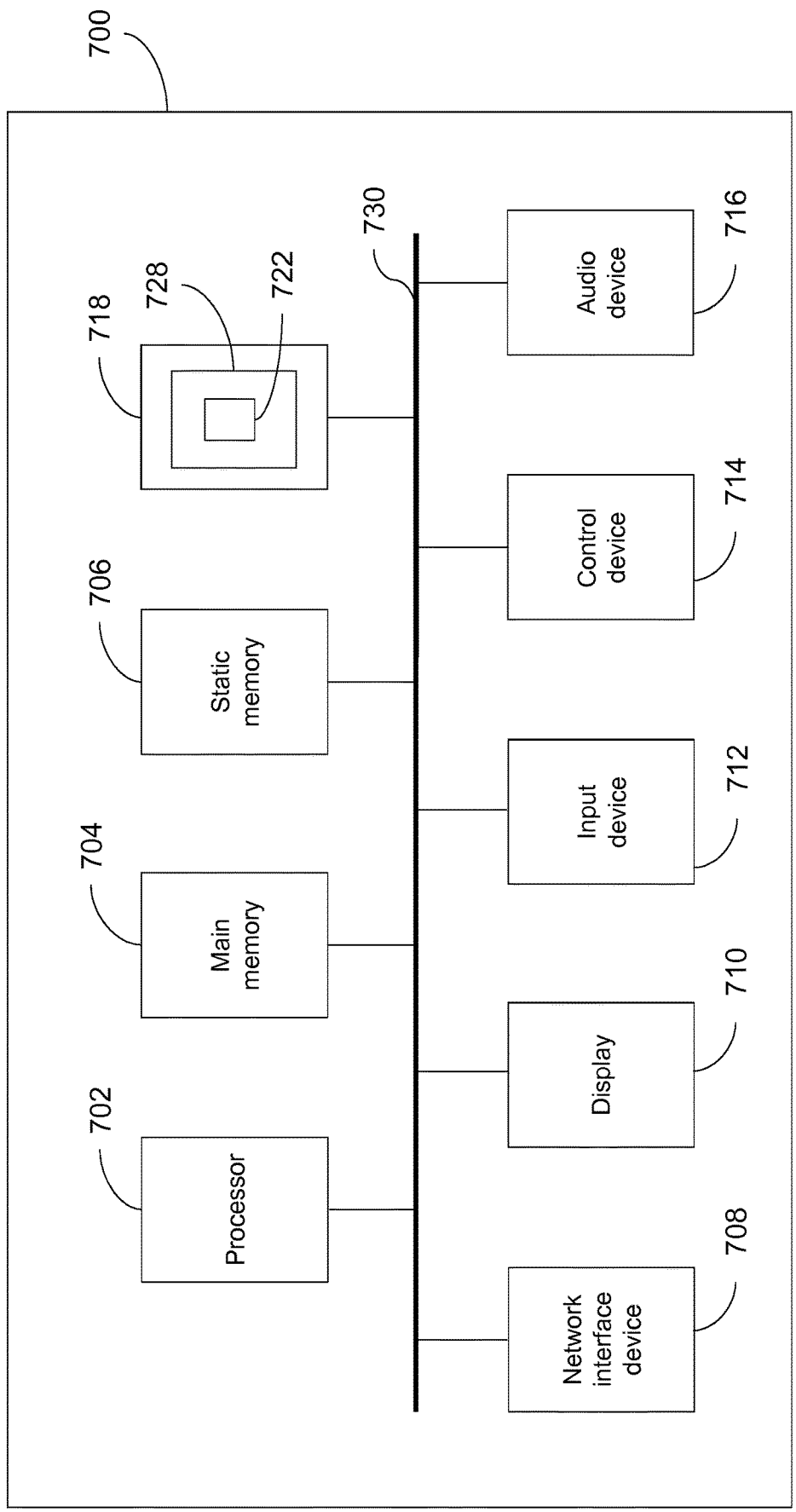
FIG. 7 illustrates a computing device.

FIG. 7 illustrates a block diagram of one implementation of a computing device 700, for example a mobile device as described above, within which a set of instructions, for causing the computing device to perform any one or more of the methodologies discussed herein, may be executed. In alternative implementations, the computing device may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. The computing device may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein.

The example computing device 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a secondary memory (e.g., a data storage device 718), which communicate with each other via a bus 730.

Processing device 702 represents one or more general-purpose processors such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. Processing device 702 is configured to execute the processing logic (instructions 722) for performing the operations and steps discussed herein.

The computing device 700 may further include a network interface device 708. The computing device 700 also may include a video display unit 710 (e.g., a liquid crystal display (LCD) or a cathode ray tube (CRT)), an alphanumeric input device 712 (e.g., a keyboard or touchscreen), a cursor control device 714 (e.g., a mouse or touchscreen), and an audio device 716 (e.g., a speaker).

The data storage device 718 may include one or more machine-readable storage media (or more specifically one or more non-transitory computer-readable storage media) 728 on which is stored one or more sets of instructions 722 embodying any one or more of the methodologies or functions described herein. The instructions 722 may also reside, completely or at least partially, within the main memory 704 and/or within the processing device 702 during execution thereof by the computer system 700, the main memory 704 and the processing device 702 also constituting computer-readable storage media.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or nontransitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

In an implementation, the modules, components and other features described herein can be implemented as discrete components or integrated in the functionality of hardware components such as ASICS, FPGAs, DSPs or similar devices.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the following discussion, it is appreciated that throughout the description, discussions utilizing terms such as "receiving", "determining", "comparing", "enabling", "maintaining", "identifying", "causing", "decrypting", "encrypting", "generating", "sending", or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. A method of displaying content items on a display, the method comprising
   receiving encrypted content items in a chronological sequence;
   decrypting the encrypted content items to obtain decrypted content items;
   for each of the decrypted content items, generating a place holder, wherein each place holder is generated as a sequence of symbols so that the place holder has an appearance of a scrambled version of the respective decrypted content item upon displaying;
   displaying of a display sequence, in order of the chronological sequence, of the respective place holder in place of each of the decrypted content items; and,
   in response to a user input, displaying of the respective decrypted content item in place of one or more of the place holders, wherein the decrypted content items are displayed at different times, such that only the most recent decrypted content item is displayed in place of one or more of the place holders.

2. The method according to claim 1, wherein displaying the respective content item in place of one or more of the place holders comprises displaying an animation of the place holder turning into the content item.

3. The method according to claim 2, wherein at least one of the content items and the respective at least one place holder comprise text and displaying an animation comprises progressively changing symbols of the place holder text into symbols of the content item text over a period of time.

4. The method according to claim 3, wherein the at least one respective place holder comprises a random sequence of symbols replacing at least a portion of the content item.

5. The method according to claim 2, wherein at least one of the content items and the respective at least one place holder comprise an image and displaying an animation comprises displaying a sequence of images combining the place holder and content item images and fading from the place holder image to the content item image.

6. The method according to claim 5, wherein the respective at least one place holder comprises a noise pattern replacing the image of the at least one content item.

7. The method according to claim 5, wherein the image of the at least one content item is a preview of a larger image or a frame of a video.

8. The method according to claim 1, wherein the user input comprises a scroll command to scroll the display sequence.

9. The method according to claim 8, wherein causing display of a respective content item in place of one or more place holders comprises causing display of the respective content item in place of the one or more place holders for one or more most recent content items in the display sequence.

10. The method according to claim 1, the method comprising receiving a new content item, decrypting the new content item and causing display of the new content item as a new item in the display sequence.

11. The method according to claim 10, the method comprising, in response to receiving the new content item, displaying a place holder in place of the previously most recent content item, wherein the place holder has an appearance of a scrambled version of the previously most recent content item.

12. The method according to claim 1, wherein each content item is a message item in a messaging application or service.

13. The method according to claim 1, wherein the user input is one of:
   a request to scroll the display;
   a swipe gesture on a touch screen of the display to scroll the display;
   a tap on a touch screen area taken up by the display or a specific button to scroll the display;
   a key press on a key board to scroll the display;
   a mouse click to scroll the display;
   a voice command to scroll the display;
   a user interaction starting or opening an application or service; or
   an input switching to an application or service already running.

14. A system for displaying content items received in encrypted form, the system comprising:
   a receiver configured to receive encrypted content items in a chronological sequence;
   a memory configured to store received encrypted content items;
   a display configured to display place holders and decrypted content items; and
   a processor configured to:
      decrypt the encrypted content items to obtain decrypted content items;
      for each of the decrypted content items, generating a place holder, wherein each place holder is generated as a sequence of symbols so that the place holder has an appearance of a scrambled version of the respective decrypted content item upon displaying;
      cause display of a display sequence, in order of the chronological sequence, of the respective place holder in place of each of the decrypted content items; and,
      in response to a user input, cause display of the respective decrypted content item in place of one or more of the place holders, wherein the decrypted content items are displayed at different times, such that only the most recent decrypted content item is displayed in place of one or more of the place holders.

15. The system according to claim 14, wherein the user input is one of:
   a request to scroll the display;
   a swipe gesture on a touch screen of the display to scroll the display;
   a tap on a touch screen area taken up by the display or a specific button to scroll the display;
   a key press on a key board to scroll the display;
   a mouse click to scroll the display;
   a voice command to scroll the display;
   a user interaction starting or opening an application or service; or
   an input switching to an application or service already running.

16. Tangible computer readable medium or media encoding computer code instructions which, when executed on a computing device, implement a method according to claim 1.

* * * * *